US008873836B1

(12) United States Patent
Dietrich et al.

(10) Patent No.: US 8,873,836 B1
(45) Date of Patent: Oct. 28, 2014

(54) CLUSTER-BASED CLASSIFICATION OF HIGH-RESOLUTION DATA

(75) Inventors: David Dietrich, Hopedale, MA (US); Milind Bhandarkar, San Jose, CA (US); David Stephen Reiner, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 331 days.

(21) Appl. No.: 13/538,365

(22) Filed: Jun. 29, 2012

(51) Int. Cl.
  *G06K 9/00* (2006.01)
  *G06K 9/62* (2006.01)

(52) U.S. Cl.
  CPC .................................. *G06K 9/6267* (2013.01)
  USPC ........................................................ 382/155

(58) Field of Classification Search
  None
  See application file for complete search history.

(56) References Cited

U.S. PATENT DOCUMENTS

| | | | |
|---|---|---|---|
| 6,973,459 B1 | 12/2005 | Yarmus | |
| 8,190,537 B1 | 5/2012 | Singh et al. | |
| 8,396,286 B1 * | 3/2013 | Aradhye et al. | 382/159 |
| 8,406,525 B2 * | 3/2013 | Ma et al. | 382/191 |
| 8,533,134 B1 * | 9/2013 | Zhao et al. | 706/12 |
| 8,793,674 B2 * | 7/2014 | Ravi et al. | 717/158 |
| 2010/0082506 A1 | 4/2010 | Avinash et al. | |
| 2011/0243417 A1 | 10/2011 | Madabhushi et al. | |
| 2011/0289033 A1 * | 11/2011 | Gargi et al. | 706/20 |
| 2012/0016816 A1 * | 1/2012 | Yanase et al. | 706/10 |
| 2013/0031130 A1 * | 1/2013 | Hahm | 707/769 |
| 2013/0204948 A1 * | 8/2013 | Zeyliger et al. | 709/206 |
| 2013/0339966 A1 * | 12/2013 | Meng et al. | 718/102 |
| 2014/0143251 A1 * | 5/2014 | Wang et al. | 707/737 |
| 2014/0161360 A1 * | 6/2014 | Cao et al. | 382/218 |
| 2014/0161362 A1 * | 6/2014 | Cao et al. | 382/224 |
| 2014/0201431 A1 * | 7/2014 | Woo | 711/103 |

FOREIGN PATENT DOCUMENTS

| | | |
|---|---|---|
| GB | 2478329 A | 9/2011 |
| WO | 2009045460 A1 | 4/2009 |
| WO | 2009045471 A1 | 4/2009 |

OTHER PUBLICATIONS

Sweeney, Chris, Liu Liu, Sean Arietta, and Jason Lawrence. "HIPI: a Hadoop image processing interface for image-based mapreduce tasks." University of Virginia (2011).*

(Continued)

*Primary Examiner* — Atiba O Fitzpatrick
*Assistant Examiner* — Thomas A James
(74) *Attorney, Agent, or Firm* — Ryan, Mason & Lewis, LLP

(57) ABSTRACT

Classification of images or other types of high-resolution data is performed by a cluster-based data classification system. The system comprises a learner module, a classification director, and a complex classifier comprising a plurality of multi-outcome data classifiers. The classification director determines particular process rules and settings to be applied to a classification request, and the complex classifier is instantiated to process the classification request in accordance with the process rules and settings determined by the classification director. The process rules and settings are adapted under control of the learner module at least in part based on results obtained in processing the classification request and one or more additional classification requests. The cluster-based data classification system may be implemented on a processing platform comprising at least one Hadoop cluster, such that the classification is performed in a parallel manner across multiple processing devices utilizing MapReduce processing.

20 Claims, 3 Drawing Sheets

(56) References Cited

OTHER PUBLICATIONS

Phillip Sandhaus, Susanne Boll, "Semantic analysis and retrieval in personal and social photo collections," Multimedia Tools and Applications Jan. 2011, vol. 51, Issue 1, pp. 5-33.*

Rong Yan, Marc-Olivier Fleury, Michele Merler, Apostol Natsev, and John R. Smith. 2009. Large-scale multimedia semantic concept modeling using robust subspace bagging and MapReduce. In Proceedings of the First ACM workshop on Large-scale multimedia retrieval and mining (LS-MMRM '09). ACM, New York, NY, USA, 35-42.*

D. Zinn et al., "Parallelizing XML Processing Pipelines via MapReduce," Journal of Computer and System Sciences, Special Issue on Scientific Workflow, Accepted for publication, 2009, 12 pages.

Y. Lin et al., "Large-Scale Image Classification: Fast Feature Extraction and SVM Training," IEEE Conference on Computer Vision and Pattern Recognition, Jun. 2011, pp. 1689-1696.

C. Sweeney et al., "HIPI: A Hadoop Image Processing Interface for Image-Based MapReduce Tasks," B.S. Thesis, University of Virginia, Department of Computer Science, 2011, 5 pages.

S. Chen et al., "Map-Reduce Meets Wider Varieties of Applications," Intel Labs, Intel Research Pittsburgh, Tech Report IRP-TR-08-05, May 2008, 7 pages.

K. Wiley et al., "Astronomy in the Cloud: Using Map Reduce for Image Coaddition," Publication of the Astronomical Society of the Pacific, Mar. 2011, pp. 1-30, vol. 123, No. 901.

B. White et al., "Web-Scale Computer Vision Using MapReduce for Multimedia Data Mining," ACM 10th International Workshop on Multimedia Data Mining (MDMKDD), Jul. 2010, 10 pages.

U.S. Appl. No. 12/639,668 filed in the name of David S. Reiner on Dec. 16, 2009 and entitled "Data Storage System Having Associated Situational Analysis Framework for Automatic Response to Movement in a State Space."

* cited by examiner

CLUSTER-BASED CLASSIFICATION OF HIGH-RESOLUTION DATA

FIELD

The field relates generally to information processing systems, and more particularly to techniques for classifying high-resolution data, including data types commonly referred to as big data and unstructured data.

BACKGROUND

The classification of high-resolution data is becoming increasingly important in a wide variety of applications. For example, in medical applications, such as digital pathology, image classification can be applied to high-resolution CT scan or MRI images in order to detect and diagnose numerous diseases, illnesses or other conditions.

Other examples of high-resolution image classification applications include security applications involving image or face recognition, oil and gas exploration applications involving analysis of geological images, and astrophysics applications involving analysis of large-scale imagery of galaxies and molecular clouds.

Unfortunately, conventional techniques for image classification suffer from a number of significant drawbacks. For example, image classification in many cases remains unduly human intensive. This is particularly true in digital pathology, where millions of medical images are manually analyzed for classification purposes every year by specialists and other medical professionals. These experts study medical images and try to identify patterns they have seen before. However, there is generally no mechanism available that leverages previous image analyses across multiple classifications in an accurate and efficient way. Instead, the results of image classifications performed by various experts may remain scattered across unrelated processing systems.

Existing medical image processing approaches therefore involve creating and reviewing high-resolution images, such as images generated by CT scans and MRIs, as a one-time event to aid in diagnosing a condition at a given point in time. Because these images are so intensive with regard to the size of the images and high-resolution medical imaging requires significant space to store and manage, they are archived to tape periodically and are not readily available for subsequent analysis to help diagnose future, similar medical conditions.

Similar analysis problems exist in other high-resolution data classification applications. Conventional approaches fail to adapt the classification process based on data-specific factors or past classification history.

Accordingly, a need exists for improved data classification techniques that can adapt more readily over time and are better suited to implementation in parallel processing arrangements.

SUMMARY

Illustrative embodiments of the present invention include information processing systems that incorporate functionality for cluster-based classification of high-resolution data. In one or more embodiments, the cluster-based classification is more particularly configured for image classification, but the disclosed techniques can be adapted in a straightforward manner for application to a wide variety of other types of data, including data types commonly referred to as big data and unstructured data.

In one embodiment, classification of images or other types of high-resolution data is performed by a cluster-based data classification system. The system comprises a learner module, a classification director, and a complex classifier comprising a plurality of multi-outcome data classifiers. The classification director determines particular process rules and settings to be applied to a classification request, possibly including, for example, selection of one or more image classifiers and image feature extractors, and the complex classifier is instantiated to process the classification request in accordance with the process rules and settings determined by the classification director. The process rules and settings are adapted under control of the learner module at least in part based on results obtained in processing the classification request and one or more additional classification requests, which may comprise prior or subsequent classification requests or combinations thereof.

By way of example, the cluster-based data classification system may be implemented on a processing platform comprising at least one Hadoop cluster, such that the classification is performed in a parallel manner across multiple processing devices utilizing MapReduce processing.

The illustrative embodiments advantageously overcome one or more of the above-noted drawbacks of conventional approaches. For example, one or more of these embodiments is configured in a manner that can adapt the classification process based on data-specific factors or past classification history. As another example, embodiments of the invention may be configured in a manner that facilitates massive parallel processing of high-resolution data, using large numbers of geographically distributed servers, computers or other machines connected to the Internet.

DETAILED DESCRIPTION

The present invention will be described herein with reference to exemplary information processing systems and associated servers, computers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
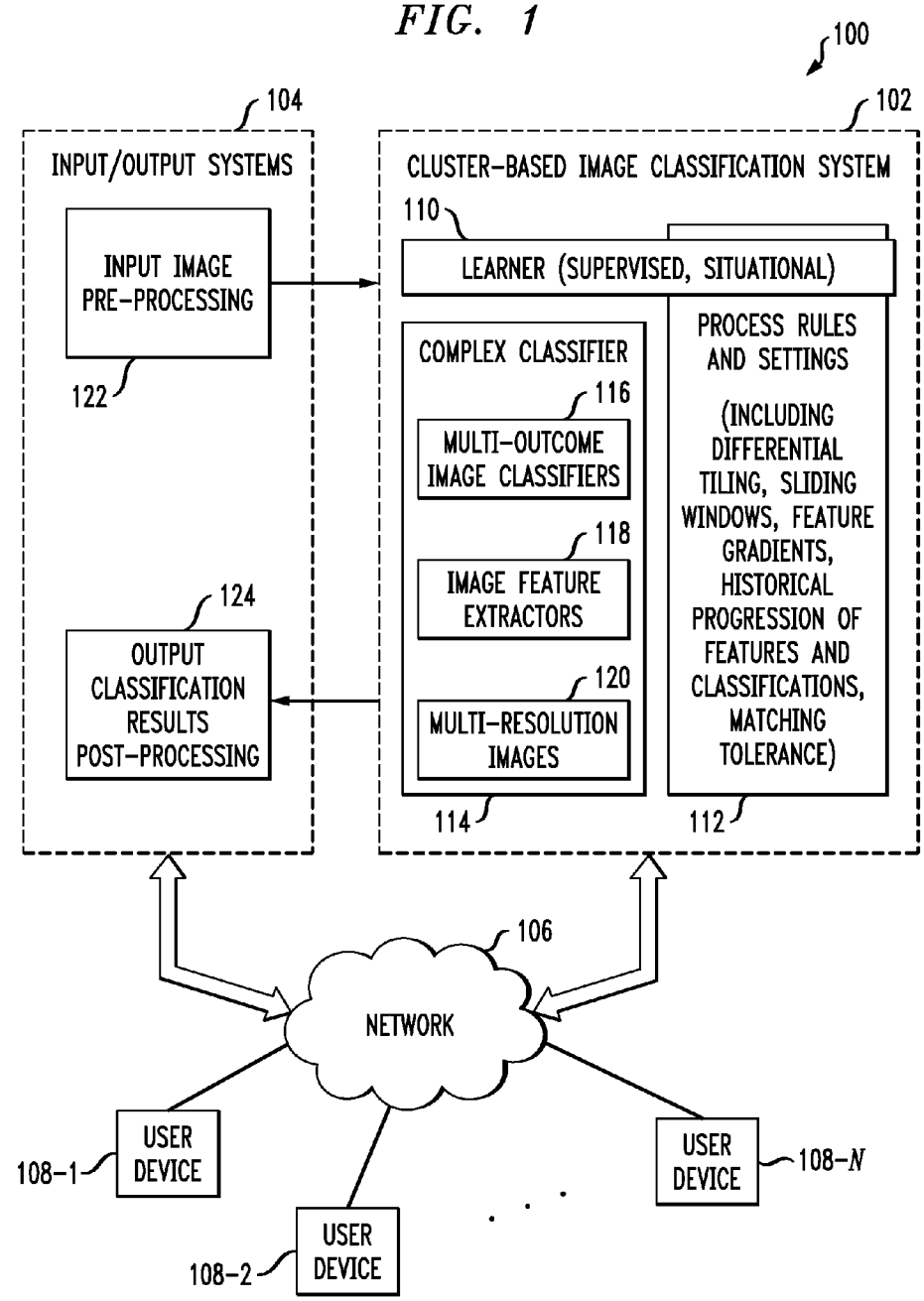
FIG. 1 shows an information processing system configured for cluster-based image classification in an illustrative embodiment of the invention.

FIG. 1 shows an information processing system 100 configured in accordance with an illustrative embodiment of the invention. The system 100 in this embodiment comprises a cluster-based image classification system 102 coupled to a set of input/output systems 104. The image classification system 102 and the input/output systems 104 are both coupled to a network 106 but may additionally or alternatively communicate with one another over other channels as indicated in the figure.

Also coupled to the network 106 are multiple user devices 108-1, 108-2, ... 108-N that are configured to communicate with at least a portion of the systems 102 and 104 over the network 106.

The user devices 108 may be implemented as respective processing devices. A given such processing device may comprise, for example, a computer, a mobile telephone or other type of communication device. Each such processing device generally comprises at least one processor and an associated memory, and implements one or more functional modules for allowing users to access certain features of the system 100. It is also possible that multiple user devices 108 can be implemented on a single processing device.

Also, each of the user devices 108 may be associated with a different user, or multiple user devices may be associated with a single user. The term "user" as utilized herein is intended to be broadly construed so as to encompass, for example, a human user associated with a given user device, an automated user such as an application or other hardware or software component associated with a given user device, or any other entity that may interact with the classification system 102 or the input/output systems 104 over the network 106.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Although input/output systems 104 are illustratively shown as being separate from the cluster-based image classification system 102 in FIG. 1, in other embodiments one or more of the input/output systems 104 could be at least partially incorporated within the classification system 102 or user devices 108.

The system 102 in the present embodiment is particularly configured for image classification, but it is to be appreciated that the disclosed techniques can be adapted in a straightforward manner for application to a wide variety of other types of data, including data types commonly referred to as big data and unstructured data. Accordingly, the system 102 may be viewed as one possible example of what is more generally referred to herein as a cluster-based data classification system. The term "cluster" in this context is intended to be broadly construed, so as to encompass any of a wide variety of different arrangements of multiple physical or virtual processing devices, in any combination.

As illustrated in FIG. 1, the cluster-based image classification system 102 comprises a learner module 110 that interacts with a set of process rules and settings 112, and a complex classifier 114 that includes multi-outcome image classifiers 116, image feature extractors 118 and multi-resolution images 120. The process rules and settings 112 in the present embodiment may include, for example, process rules and settings relating to one or more of differential tiling, sliding windows, feature gradients, historical progression of features and classifications, image matching tolerance, etc.

The process rules and settings 112 may be associated with a classification director that is not explicitly shown in FIG. 1 but may be configured to determine particular ones of the process rules and settings 112 to be applied to a given incoming image classification request. An example of one possible classification director implementation will be described below in conjunction with FIG. 2. In that embodiment, particular ones of the multi-outcome image classifiers 116, image feature extractors 118 and multi-resolution images 120 are controllably selected for use in processing a given image classification request under control of the classification director.

The resulting instantiated complex classifier 114 is configured to process the given image classification request in accordance with the selected ones of the process rules and settings 112 as determined by the classification director. Moreover, one or more of the process rules and settings 112 are adapted under control of the learner module 110 at least in part based on results obtained in processing the given classification request and one or more additional image classification requests.

The learning process implemented in learner module 110 may include at least one of supervised learning and situational learning. The situational learning implemented in embodiments of the present invention can make use of one or more of the situational analysis techniques disclosed in U.S. patent application Ser. No. 12/639,668, filed Dec. 16, 2009 and entitled "Data Storage System Having Associated Situational Analysis Framework for Automatic Response to Movement in a State Space," which is commonly assigned herewith and incorporated by reference herein.

The image classification requests may be received from an input image pre-processing module 122 implemented within the input/output systems 104. Alternatively, one or more such requests may be received directly by classification system 102 from one or more of the user devices 108 over the network 106. In such arrangements, portions of the input/output systems 104 may be viewed as being implemented within the user devices 108. Corresponding classification results are provided by the classification system 102 to an output classification results post-processing module 124 implemented within the input/output systems 104. The post-processing module 124 may be operative to take one or more actions based on each of the classification results. As with the requests, classification results may be communicated directly between the classification system 102 and the user devices 108, and in such arrangements, portions of the input/output systems 104 may be viewed as being implemented within the user devices 108.

The cluster-based image classification system 102 may be implemented on at least one processing platform comprising a plurality of processing devices each including a processor coupled to a memory. Examples of such processing platforms will be described below in conjunction with FIGS. 3 and 4.

In one or more of the illustrative embodiments, the cluster-based image classification system 102 comprises at least one Hadoop cluster or other type of parallelizable cluster. In such arrangements, the cluster-based image classification system processes a given classification request at least in part in a parallel manner across multiple processing devices utilizing MapReduce processing. Numerous other types of parallel processing techniques may be used, including, for example, MongoDB, Cassandra or other similar parallelizable cluster file systems, parallelizable cluster database systems and paradigms.

It should be understood that a given embodiment of the system 100 may include multiple instances of the elements 102, 104 and 106, although only single instances of such elements are shown in the system diagram for clarity and simplicity of illustration.

Also, numerous other arrangements of servers, computers, storage devices or other components are possible in the information processing system 100. Such components can communicate with other elements of the information processing system 100 over any type of network or set of networks.

It is therefore to be appreciated that the particular set of elements shown in FIG. 1 for providing cluster-based image classification functionality is presented by way of example, and in other embodiments additional or alternative elements may be used. Thus, another embodiment may include additional networks and additional sets of systems, or other types and arrangements of processing devices.

Figure 2:
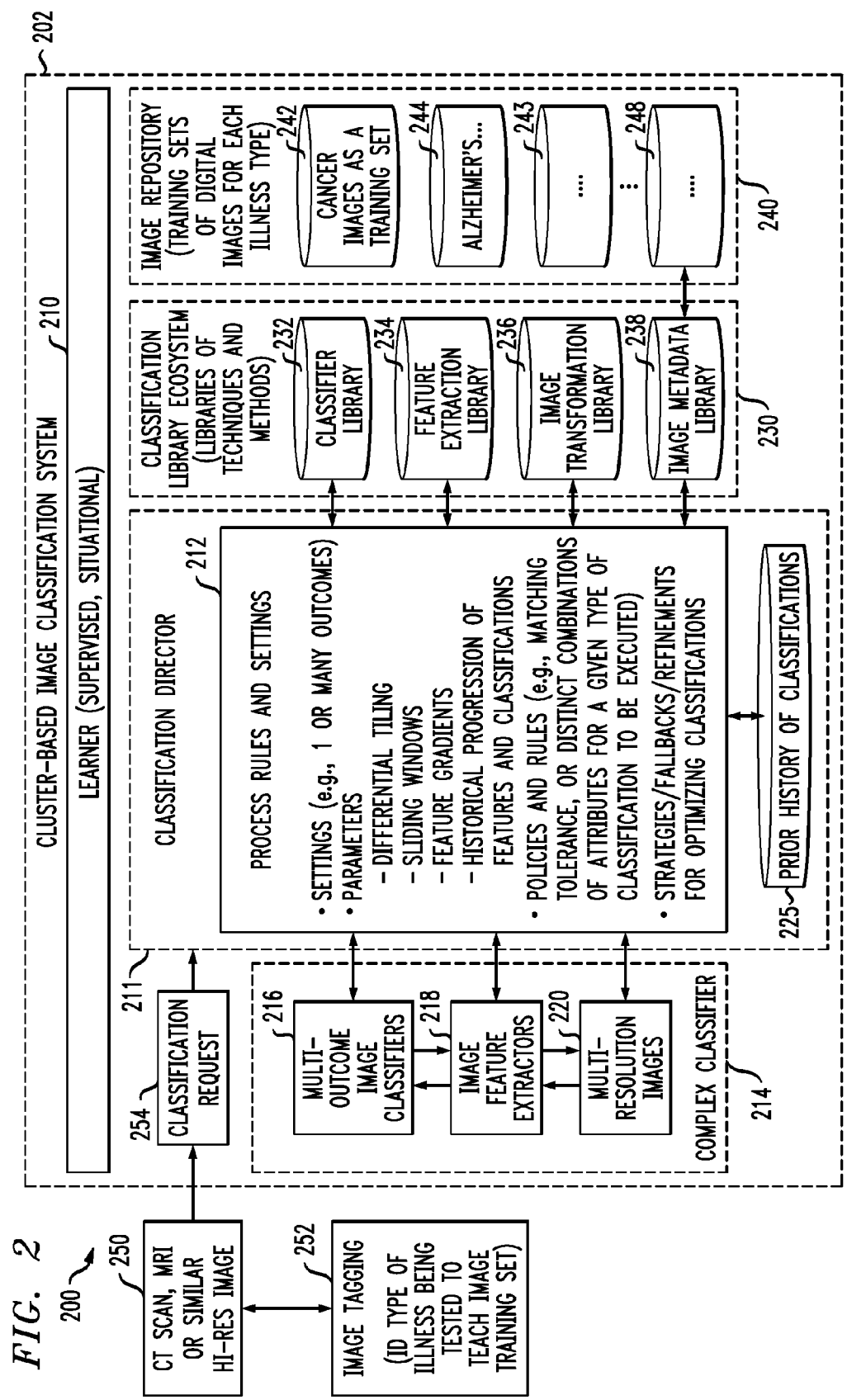
FIG. 2 shows a more detailed view of a cluster-based image classification portion of an information processing system in an illustrative embodiment.

Referring now to FIG. 2, another illustrative embodiment of the invention is shown. In this embodiment, an information processing system 200 comprises a cluster-based image classification system 202. The classification system 202 comprises learner 210, a classification director 211 comprising process rules and settings 212, and a complex classifier 214 that includes multi-outcome image classifiers 216, image feature extractors 218 and multi-resolution images 220. Elements 210, 212, 214, 216, 218 and 220 are generally configured in the manner described previously for the corresponding elements 110, 112, 114, 116, 118 and 120 of the classification system 102 of FIG. 1. The process rules and settings 212 in the present embodiment include additional exemplary process rules and settings, such as a setting for specifying a number of outcomes, policies and rules specifying distinct combinations of attributes for a given type of classification to be executed, and strategies, fallbacks and refinements for optimizing classifications within the complex classifier 214.

In the FIG. 2 embodiment, the classification director 211 determines the particular ones of the process rules and settings 212 to be applied to a given incoming classification request at least in part based on information characterizing prior history of classifications 225. Also, the classification director 211 determines the particular ones of the process rules and settings 212 to be applied to the classification request at least in part based on information in a classification library 230, illustratively shown in the figure as a classification library ecosystem comprising libraries of techniques and methods. For example, the classification director may select components to be utilized in a given instantiation of the complex classifier 214 from these libraries of techniques and methods. More particularly, the classification director may select components that provide an optimal classification strategy for a given classification request, and may therefore select the best combination of items from the libraries to feed into and manage the corresponding instantiation of complex classifier 214. These examples are considered to be illustrations of the manner in which the classification director determines the particular ones of the process rules and settings 212 to be applied to the classification request at least in part based on information in classification library 230.

The classification library 230 in the present embodiment more particularly comprises a classifier library 232, a feature extraction library 234, an image transformation library 236 and an image metadata library 238. The image transformation library 236 may be configured to implement adaptive mesh refinement (AMR) functionality. In other embodiments, only a subset of the elements 232, 234, 236 and 238 may be included in the classification library 230.

In determining the particular ones of the rules and settings 212 to be applied to a given classification request, the classification director 211 also utilizes information in an image repository 240. This information may include, for example, a plurality of different training sets of data 242, 244, 246 and 248 for respective distinct classification categories. In one application of the classification system 202, the system may be used to classify images against distinct classification categories associated with respective medical diagnoses, such as cancer using cancer images of training set 242, and Alzheimer's disease using Alzheimer's disease images of training set 244, as well as many others. Thus, the image repository 240 in the present embodiment includes distinct training sets of digital images for each of a number of different illness types.

A given input image 250 to be classified by the cluster-based image classification system 202 may comprise a high-resolution medical image generated in conjunction with a CT scan or an MRI. The given image and other images processed by the classification system 202 may be subject to image tagging 252 in order to facilitate generation of image training sets 242, 244, 246 and 248 for respective ones of the distinct classification categories of medical diagnoses that are supported. By way of example, the image tagging process may involve assigning an identifier of the particular type of illness being tested for in order to facilitate classification of the image or a set of images for diagnostic purposes, and additionally or alternatively to facilitate teaching functionality associated with generation of the image training sets. The training sets may illustratively comprise one or more reference sets.

Although the FIG. 2 embodiment illustrates a single input image 250, the disclosed techniques can of course be applied to multiple images simultaneously, as in an arrangement in which a set of images is subject to classification by classification system 202. Accordingly, input image 250 in this and other embodiments may be more generally viewed as representing a single image or a set of images. Functionality illustratively described herein with reference to a single image should therefore be understood as being adaptable in a straightforward manner for use with a set of images.

The classification system 202 receives a classification request 254 corresponding to the input image 250, determines particular ones of the process rules and settings 212 to be applied to the classification request 254, instantiates a particular implementation of complex classifier 214 comprising selected ones of the multi-outcome image classifiers 216, the image feature extractors 218 and the multi-resolution images 220 in order to process the classification request 254 in accordance with the particular process rules and settings, and then processes the classification request utilizing the instantiated complex classifier.

By way of example, in determining the particular process rules and settings to be applied to the classification request 254, the classification director may control application of one or more of a number of available image analysis functions in conjunction with processing of the classification request by the complex classifier. These available image analysis functions may include one or more of differential tiling, sliding windows, feature gradients, historical progression of features and classifications, image matching tolerance factors, distinct combination or attributes for a given type of classification to be executed, and optimization strategies, fallbacks and refinements.

Also, one or more of the process rules and settings may be adjusted at least in part based on results obtained in processing the classification request 254 and possibly one or more additional classification requests. Thus, for example, classification results from one or more prior classification requests may be used to adjust the process rules and settings applied to processing of a current classification request. Also, the overall process rules and settings available within classification system 202 may be more generally adjusted using any set of classification results, which may be generated for prior or subsequent classification requests relative to the current classification request, in any combination.

Thus, in the classification system 202, a different configuration of the complex classifier 214 may be instantiated for processing each of a plurality of classification requests, and the process rules and settings 212 can be dynamically modified in conjunction with processing of the classification request. The classification system 202 in the present embodiment may therefore be viewed as operating in three distinct phases when processing a given classification request, namely, an instantiation phase, an execution phase, and a dynamic process modification phase. Of course, numerous other arrangements of processing phases may be used in other embodiments.

The illustrative embodiment of FIG. 2 provides a number of significant improvements over conventional arrangements. For example, rather than using a single classifier, the classification systems 202 can leverage multiple outcomes and multiple classifiers. This means that the system can use an ensemble of classifiers that is the most suitable to classify an image associated with a given illness, and when combined with the optimal image resolution, can provide greater precision and clarity to an image and its associated area of interest. In addition, the system 202 can identify illnesses based on historical training sets of images for which the operator of the system may not have been deliberately testing. In other words, someone may be testing an image for the presence of cancer, but may find out the patient has a different illness altogether.

The system 202 also allows analysis metrics to be applied for gauging complex analysis over time using a historical set of classifications and images. These can range from simple metrics such as the percentage of healthy tissue in a given tile or image to a ratio (e.g., a ratio of healthy tissue to unhealthy tissue) to time series analysis (e.g., the amount of unhealthy tissue over time and its rate of change). Moreover, the classification system 202 has the ability to apply metrics of varying complexity to a given set of images at varying resolution levels. Thus, the system can apply complex metrics over time utilizing prior classification history as well as metadata relating to patient history.

Other features of classification system 202 provide additional improvements relative to conventional systems. For example, in one embodiment, the sliding window functionality of the classification system 202 may be configured to address situations in which certain features of an image to be classified may fall off or emerge as the resolution changes. Sliding window functionality of the system 202 may be applied, by way of example, to tiles within a given image or to time-based processing of multiple images. Also, the context of prior classifications, or metadata, enables the development of more robust training sets, and therefore more precise classification algorithms in a given instantiation of the complex classifier 214. For example, metadata within the libraries can be tapped into so as to enable better outcomes for future classification instances.

In addition, the use of AMR can assist in identifying areas of interest within a given image, and thereby expose nuances of the image in a way that both allows the system to optimize the processing in terms of performance and the accuracy of the classification. Thus, AMR can be used to enhance specific aspects of an image. In the context of digital image classification for medical research, AMR could be used for imposing a Cartesian grid system on a digital image, then enabling high-resolution details only on the areas of the image that are of interest or germane to the analysis used to obtain a diagnosis. In addition, images of various resolution levels could be matched to improve confidence in the diagnosis for certain types of medical conditions. Leveraging AMR in this way could also improve the storage requirements and retrieval times of the images, since lower resolution images can be kept in the highest tier of storage with higher resolution versions of the image being kept in different storage tiers, if necessary.

Multi-resolution imagery can be used in a given embodiment to optimize accuracy of diagnoses. For example, high-resolution images could be scanned and gradations of these images could be stored in various states of resolution to enable optimal diagnosis, based on the selected image resolution. That is, certain types of medical conditions may be more easily detected with low, medium, or very high resolution levels. Storing copies of these multi-resolution images, and having the ability to use the appropriate level of resolution, will aid in diagnosing certain types of illnesses. Such functionality may be facilitated by the use of AMR as described previously.

Embodiments of the invention may apply adaptive load balancing and adaptive event scheduling techniques. For example, by leveraging AMR to determine the optimal level of resolution for the images, it would be possible to perform adaptive load balancing and adaptive event processing. In other words, the classification system 202 could be configured to process a mix of high and low resolution images in parallel to maintain acceptable system loads. Without this technique, simultaneous processing of only high-resolution images could place a heavy strain on network, storage, or computer resources.

Also, machine learning algorithms may be applied for time series analysis of images to diagnose changes in medical conditions. Many medical conditions change or worsen over time, but without sufficient image history it is not possible to detect how much an illness has progressed or changed over time. By storing and classifying these images in a systematic, algorithmic fashion, the classification system 202 can provide a pathologist with information relating to the rate of change of a particular illness and whether a given condition represents a change in condition or a steady state for a given patient.

It should also be noted that cluster-based processing utilizing Hadoop clusters or other parallelization mechanisms provides scalability to handle very large amounts of data that would be intractable in conventional systems. For example, implementations of the classification system 202 can be readily configured for massive parallel processing of image data, using large numbers of geographically distributed servers, computers or other machines connected to the Internet.

Embodiments of the invention can be adapted to enable hospitals and medical clinics to leverage digital images to diagnose illnesses and expedite the diagnosis of medical conditions, including rare or unusual cases. For example, a given high-resolution digital image, such as an image generated in a CT scan or MRI, can be classified by the classification system 202 in the following manner. Under the control of the classification director 211, a digital pixel recognition algorithm may be selected to interpret the image. Such an algorithm could be used to create a ratio of healthy tissue in a part of a body to unhealthy or malignant tissue, in a manner analogous to the operation of anti-virus (AV) software. For example, AV-like software could be used in classification system 202 to process an image so as to determine a ratio of cancerous brain tissue to healthy brain tissue within the image, and then classify the image at least in part based on the ratio.

In addition, a machine learning algorithm, such as a Naïve Bayes classifier, could be used to classify the images for specific types of medical problems in a binary way. For example, in the case of scanning and interpreting images from high-resolution CT scans on a human brain, the Naïve Bayes classifier could produce a binary output, such as "Alzheimer's" or "Not Alzheimer's".

A given classification algorithm implemented in classification system 202 may be run using a supervised learning method, such that as the count of digital images increases, the algorithm would be continually trained to become more precise and accurate as its experience increases.

Classification of high-resolution digital images enables further inferencing and automation related to disease detection, and usage of these images as data sets. This represents an improved approach to describing and subsequently acting on medical imagery to enable more accurate and faster diagnoses. Such an approach also supports the description and maintenance of properties, assertions, constraints and rules about individual digital images and across multiple, interrelated sets of digital images.

A number of exemplary use cases of classification system 202 will now be described in order to further illustrate functionality that may be provided in illustrative embodiments of the invention. Although these examples are mainly from the health care domain, the concepts are readily adaptable for use with other types of data.

1. Confirm or corroborate a medical diagnosis made by a human doctor.

2. Identify additional possible illnesses or diagnoses, which may have not occurred to the technician or doctor interpreting the digital images. For instance, a doctor may have considered a specific diagnosis and ruled out other possible illnesses that may have been counterintuitive, or which he may not have encountered in his working career and therefore not been able to diagnose well.

3. Store digital images to enable long-term archive and retrieval for subsequent analysis by doctors, academic researchers, and forensics teams.

4. Examine past conditions when diagnosing a patient for a new or emerging illness.

In the above-noted use cases, storing and analyzing high-resolution images enables much richer medical analytics and more accurate diagnoses than are possible using conventional techniques. For example, the classification system 202 may be utilized to supplement what human technicians and doctors currently do by automating some initial diagnoses and focusing human interpretation on nuances of the diagnosis, rather than on selecting candidate illnesses or patient conditions for a given image or medical scan. In addition, by providing longer term storage of these images, patients and doctors have the ability to see changes over time and compare point-in-time snapshots of digital images to new conditions a patient may experience years after undergoing the initial MRI or CT scans.

Features similar to those outlined in the above examples in the context of cluster-based image classification system 202 of FIG. 2 may also be provided in the classification system 102 of FIG. 1.

It should be understood that the various processing operations and other classification system functionality described above are presented by way of illustrative example only, and should not be construed as limiting the scope of the invention in any way. Alternative embodiments can use other types of processing operations or functionality for classifying images and other high-resolution data.

As indicated previously, the information processing system 100 or 200 may be implemented using one or more processing platforms. One or more of the processing modules or other components of system 100 or 200 may therefore each run on a computer, server, storage device or other processing platform element. A given such element may be viewed as an example of what is more generally referred to herein as a "processing device." Examples of processing platforms that may be used to implement at least portions of the system 100 or 200 will now be described with reference to FIGS. 3 and 4.

Figure 3:
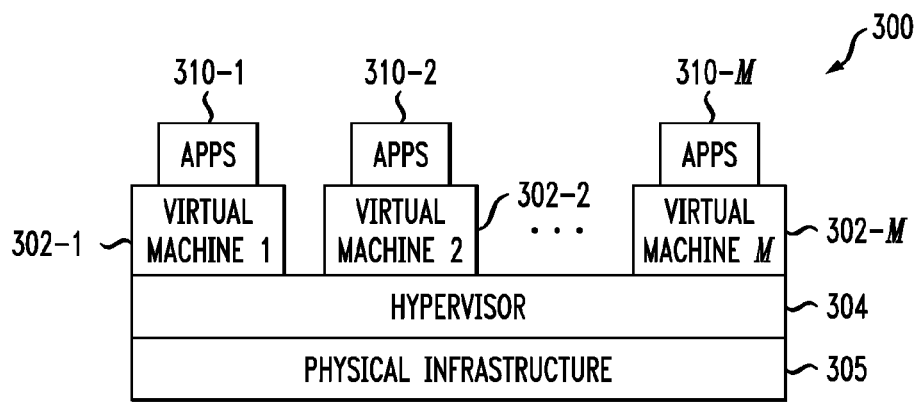
FIGS. 3 and 4 show examples of processing platforms that may be utilized to implement at least a portion of the FIG. 1 and FIG. 2 information processing systems.

Referring initially to FIG. 3, portions of the information processing system 100 or 200 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or 200 or only portions of that system, such as the cluster-based image classification system 102 or 202. Thus, for example, the cluster-based image classification system 102 or 202 may run at least in part on one or more of the virtual machines 302.

Although only a single hypervisor 304 is shown in the embodiment of FIG. 3, the system 100 or 200 may of course include multiple hypervisors each providing a set of virtual machines using at least one underlying physical machine.

An example of a commercially available hypervisor platform that may be used to implement hypervisor 304 and possibly other portions of the cloud infrastructure of information processing system 100 or 200 in one or more embodiments of the invention is the VMware® vSphere™ which may have an associated virtual infrastructure management system such as the VMware® vCenter™. The underlying physical machines may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure of system 100 or 200.

Figure 4:
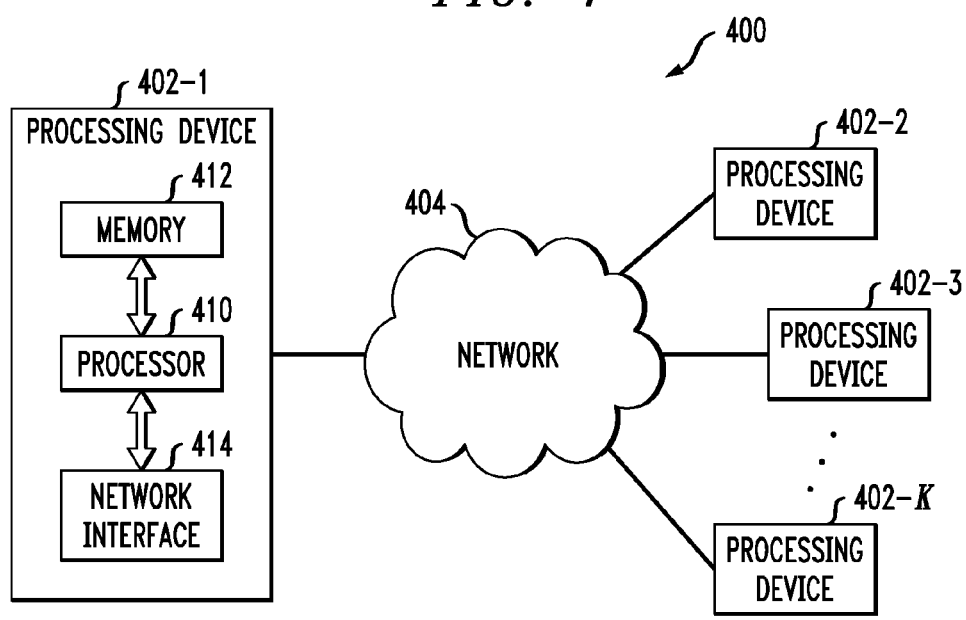

Another example of a processing platform that may be utilized to implement at least portions of system 100 or 200 is processing platform 400 shown in FIG. 4. The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "computer program product" having executable computer program code embodied therein, may comprise random access memory (RAM), read-only memory (ROM) or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 or 200 may include additional or alternative processing platforms, as well as numerous distinct processing platforms in any combination, with each such platform comprising one or more computers, servers, storage devices or other processing devices.

Multiple elements of information processing system 100 or 200 may be collectively implemented on a common processing platform of the type shown in FIG. 3 or 4, or each such element may be implemented on a separate processing platform.

Cluster-based image classification functionality such as that described herein can be implemented at least in part in the form of one or more software programs stored in memory and executed by a processor of a processing device such as a computer or server. As indicated previously, a memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, cluster-based data classification systems, data types and classification applications. Numerous other alternative embodiments within the scope of the appended claims will be readily apparent to those skilled in the art.

What is claimed is:

1. An apparatus comprising:
  a cluster-based data classification system comprising:
    a learner module;
    a classification director; and
    a complex classifier comprising a plurality of multi-outcome data classifiers;
  wherein the classification director is configured to determine particular process rules and settings to be applied to a classification request;
  wherein the complex classifier is instantiated to process the classification request in accordance with the process rules and settings determined by the classification director; and
  wherein one or more of the process rules and settings are adapted under control of the learner module at least in part based on results obtained in processing the classification request and one or more additional classification requests.

2. The apparatus of claim 1 wherein the cluster-based data classification system is implemented on at least one processing platform comprising a processor coupled to a memory.

3. The apparatus of claim 1 wherein the cluster-based data classification system comprises at least one Hadoop cluster.

4. The apparatus of claim 1 wherein the cluster-based data classification system processes the classification request at least in part in a parallel manner across multiple processing devices utilizing MapReduce processing.

5. The apparatus of claim 1 wherein the complex classifier further comprises, in addition to the plurality of multi-outcome data classifiers, a plurality of feature extractors and a plurality of multi-resolution data sets, and wherein particular ones of the multi-outcome data classifiers, feature extractors and multi-resolution data sets are controllably selected for use in processing the classification request under control of the classification director.

6. The apparatus of claim 1 wherein the classification director determines the particular process rules and settings to be applied to the classification request at least in part based on information characterizing prior history of classifications.

7. The apparatus of claim 1 wherein the classification director determines the particular process rules and settings to be applied to the classification request at least in part based on information in a classification library.

8. The apparatus of claim 7 wherein the classification library comprises one or more of a classifier library, a feature extraction library, a data transformation library and a metadata library.

9. The apparatus of claim 8 wherein the data transformation library is configured to implement adaptive mesh refinement functionality.

10. The apparatus of claim 1 wherein the classification director determines the particular process rules and settings to be applied to the classification request at least in part based on information in a data repository.

11. The apparatus of claim 10 wherein the data repository comprises a plurality of different training sets of data for respective distinct classification categories.

12. The apparatus of claim 1 wherein the cluster-based data classification system is configured to classify an image or a set of images.

13. The apparatus of claim 12 wherein the cluster-based data classification system is configured to classify the images against distinct classification categories associated with respective medical diagnoses.

14. The apparatus of claim 13 wherein the cluster-based data classification system is configured to tag one or more images associated with incoming classification requests in order to facilitate generation of image training sets for respective ones of the distinct classification categories.

15. The apparatus of claim 12 wherein the classification director in determining the particular process rules and settings is further configured to control application of one or more of the following image analysis functions in conjunction with processing of the classification request by the complex classifier:
  differential tiling;
  sliding windows;
  feature gradients;
  historical progression;
  matching tolerance factors;
  distinct combinations of attributes; and
  optimization strategies, fallbacks and refinements.

16. A method comprising the steps of:
  receiving a classification request;
  determining particular process rules and settings to be applied to the classification request;
  instantiating a complex classifier comprising a plurality of multi-outcome data classifiers to process the classification request in accordance with the process rules and settings;
  processing the classification request utilizing the instantiated complex classifier; and
  adapting one or more of the process rules and settings at least in part based on results obtained in processing the classification request and one or more additional classification requests.

17. The method of claim 16 wherein a different configuration of the complex classifier is instantiated for processing each of a plurality of classification requests.

18. The method of claim 16 wherein the process rules and settings are dynamically modified in conjunction with processing of the classification request.

19. A computer program product comprising a processor-readable storage medium having encoded therein executable code of one or more software programs, wherein the one or more software programs when executed by a processing platform implement the steps of the method of claim 16.

20. An information processing system comprising:
- a data pre-processor operative to generate a classification request;
- a cluster-based data classification system having an input coupled to an output of the data pre-processor and operative to process the classification request to generate a classification result; and
- a classification results post-processor having an input coupled to an output of the cluster-based data classification system and operative to take one or more actions based on the classification result;

the cluster-based data classification system comprising:
- a learner module;
- a classification director; and
- a complex classifier comprising a plurality of multi-outcome data classifiers;
- wherein the classification director is configured to determine particular process rules and settings to be applied to a classification request;
- wherein the complex classifier is instantiated to process the classification request in accordance with the process rules and settings determined by the classification director; and
- wherein one or more of the process rules and settings are adapted under control of the learner module at least in part based on results obtained in processing the classification request and one or more additional classification requests.

* * * * *